United States Patent
Cvetkovich

[15] 3,653,730
[45] Apr. 4, 1972

[54] WHEEL LOCK FOR A VEHICLE
[72] Inventor: Dejan O. Cvetkovich, 212 S. Jensen Way, Fullerton, Calif. 92633
[22] Filed: Jan. 27, 1970
[21] Appl. No.: 6,246

[52] U.S. Cl. ............................303/89, 60/54.5 E, 137/598, 188/353
[51] Int. Cl. .....................................................B60t 17/16
[58] Field of Search.....................303/89; 188/353; 137/598; 60/54.5 E; 192/314

[56] References Cited

UNITED STATES PATENTS

| | | | |
|---|---|---|---|
| 3,116,752 | 1/1964 | Duncan | 188/353 X |
| 2,332,062 | 6/1943 | Schnell | 188/353 X |
| 2,585,711 | 2/1952 | Whitney | 188/353 X |
| 3,386,777 | 6/1968 | Cords | 188/353 X |
| 2,080,603 | 5/1937 | Cometto et al. | 188/353 |
| 3,515,442 | 6/1970 | Whittemore | 137/598 X |
| 2,190,981 | 2/1940 | Freeman | 188/353 |
| 2,964,141 | 12/1960 | Schlumbrecht | 188/353 |

Primary Examiner—Milton Buchler
Assistant Examiner—John J. McLaughlin
Attorney—Philip M. Hinderstein

[57] ABSTRACT

A wheel lock designed for vehicle theft prevention and comprising a valve interposed in the brake fluid line to at least one wheel brake of the vehicle. By closing the valve while the vehicle brake pedal is depressed, fluid under pressure is trapped between the valve and the brake, locking the wheels. Preferably, the valve comprises a camshaft operatively connected to a key operated rotary lock, a valve piston disposed within a housing and displaced by the camshaft, and a valve seat counterbored in a cover attached to the housing. A separate locking piston actuated by brake fluid under pressure and a solenoid respectively insure that the valve can be closed only when the brakes are applied and when the vehicle ignition system is off.

3 Claims, 3 Drawing Figures

PATENTED APR 4 1972  3,653,730
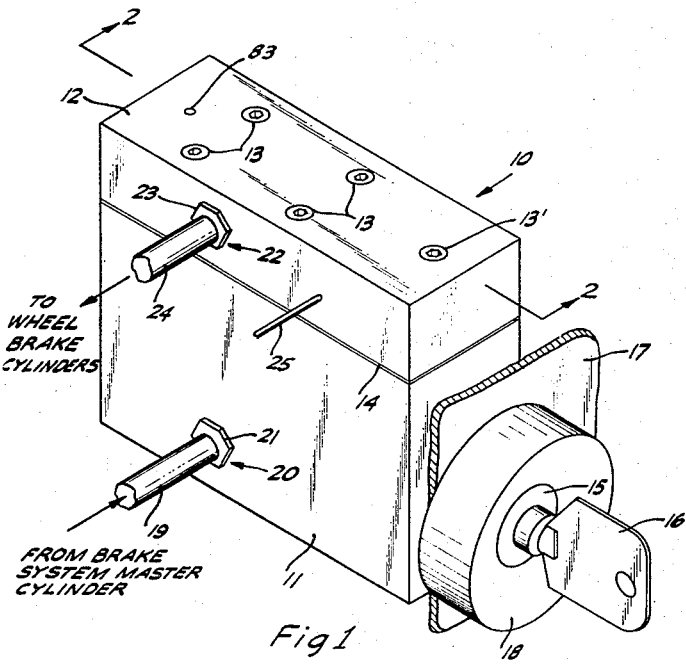
Fig 1
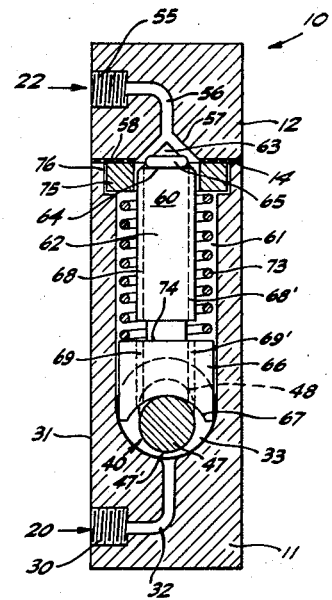
Fig 3
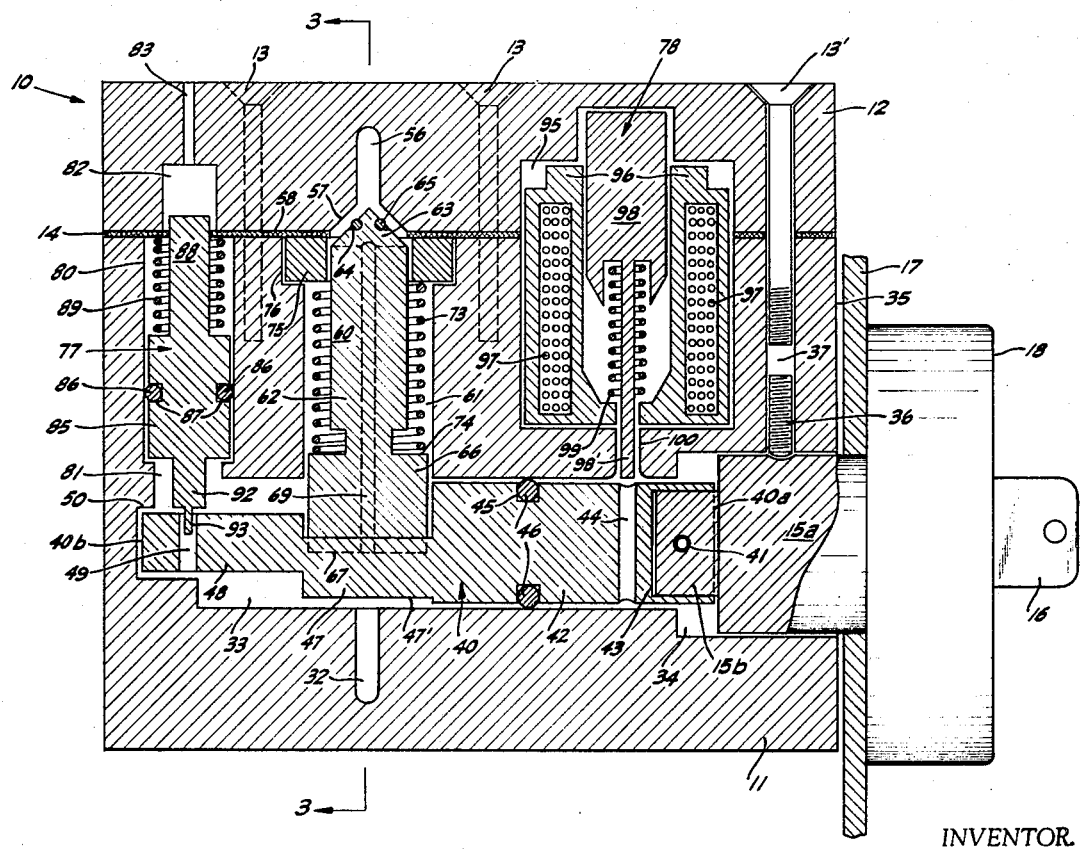
Fig 2
INVENTOR.
DEJAN O. CVETKOVICH
BY
ATTORNEYS

WHEEL LOCK FOR A VEHICLE

BACKGROUND OF THE INVENTION

1. Field of the Invention.

The present invention relates to a wheel lock designed for theft prevention of a vehicle having a fluid brake system. More particularly, the invention relates to a wheel lock comprising a key operated valve interposed in the brake fluid line to at least one wheel brake of the vehicle, and capable of trapping brake fluid under pressure between the valve and the brake cylinder to lock the wheels.

2. Description of the Prior Art.

Whether for joy riding or with criminal intent, the number of automobiles stolen each year continues to increase. The problem is a serious one, not only for inconvenience to the vehicle owner and the drain on police manpower, but also because of the danger resulting from unlicensed, unskilled operators driving the stolen vehicles on the roadway. Moreover, such stolen vehicles, particularly when stripped by the thief, represent a significant loss to the vehicle insurer.

The concern raised over the increasing number of stolen vehicles in recent years has led automobile manufacturers and others to incorporate theft prevention devices in vehicles. For example, audible alarms have been utilized to indicate that the ignition key has been left in the lock after the engine has been turned off and the car door opened. This feature has reduced the likelihood of leaving an ignition key in the car, and thus made it necessary that the person stealing the car jumper or "hot wire " the ignition to start the car. While this is some deterrent to automobile thievery, the ignition system is relatively easy to jumper, and a considerably number of automobiles still are stolen in this manner.

Another approach has been to provide a mechanical lock for the steering shaft and transmission, the lock being actuated as the ignition key is rotated to the off position. This approach is effective in that it prevents the automobile from being driven even though the engine may be started by jumpering the ignition system. However, complex mechanical arrangements are required to accomplish the locking action, thereby adding significantly to the cost of the vehicle. Moreover, such systems are not tamperproof, can be broken easily and are costly to repair.

No simple, inexpensive theft deterrent device presently is available which readily can be installed on new or used vehicles and which will prevent the vehicle from being driven, even though the engine has been turned on.

These and other shortcomings of the prior art are overcome by the present invention which comprises a wheel lock for a vehicle having a fluid brake system. The wheel lock is simple and inexpensive, and readily may be installed on any model new or used vehicle. The device prevents vehicle theft by making it impossible to roll or propel the vehicle on its own wheels when the wheel lock has been engaged. Furthermore, the inventive wheel lock is completely tamperproof.

SUMMARY OF THE INVENTION

In accordance with the present invention, there is provided a wheel lock designed for theft prevention of a vehicle having a fluid brake system. The wheel lock comprises a valve interposed in the brake fluid line to at least one wheel brake of the vehicle. By closing the valve while the vehicle brake pedal is depressed, brake fluid under pressure is trapped between the valve and the brake cylinder, locking the wheels.

In a preferred embodiment, the wheel lock is enclosed in a unitary housing extending from which is a key-operated rotary lock. The brake fluid line valve comprises a rotary camshaft, contained in a chamber in the housing and operatively connected to the key-operated lock, a valve piston, situated in the housing perpendicular to and spring biased against the camshaft, and a valve seat counterbored in a cover attached to the housing. By turning the key-operated lock, the valve piston is selectively seated in or spaced from the counterbored valve seat.

Appropriate channels are provided in the wheel lock housing and cover to permit unimpeded brake fluid flow past the camshaft and valve piston when the valve is open (i.e., when the valve piston is spaced from the counterbore). When the valve is closed, brake fluid flow is impeded; brake fluid under pressure then may be trapped between the valve and a wheel brake of the vehicle to lock the wheel.

To prevent the wheel lock valve from being closed except when the vehicle brake pedal is fully depressed, a spring-biased locking piston also is provided in the wheel lock housing. The locking piston includes a pin which engages a transverse hole through the camshaft, preventing rotation thereof. Brake fluid is in communication with one end of the locking piston, so that when the brake pedal is depressed, the pressurized brake fluid will displace the locking piston, removing the pin from the camshaft hole and permitting rotation of the camshaft. Accordingly, the camshaft only can be turned, and hence the brake line valve can be closed, only when the brake fluid is under sufficient pressure to maintain the vehicle in a standstill condition.

As another safety feature, a solenoid is provided which is electrically interconnected to the vehicle ignition system. When the ignition switch is turned on, the solenoid is actuated causing the solenoid plunger to be inserted into another transverse hole through the wheel lock camshaft. This action insures that the wheel lock cannot be engaged i.e., that the brake line valve cannot be closed) while the vehicle engine is running.

Thus, it is an object of the present invention to provide a wheel lock designed for vehicle theft prevention, and of proven operational design.

Another object of the present invention is to provide a wheel lock for use in a vehicle having a fluid brake system.

It is another object of the present invention to provide a device interposed in the brake fluid line to at least one wheel brake of a vehicle, the device including valve means for trapping brake fluid under pressure between the valve means and the wheel brake, thereby locking the vehicle wheel.

It is yet another object of the present invention to provide a wheel lock incorporating a valve interposed in a brake fluid line and operated by a camshaft attached to a key-operated lock.

A further object of the present invention is to provide a wheel lock incorporating a brake fluid line valve operated by a camshaft and having a spring-biased locking piston adapted to prevent rotation of the camshaft except when the locking piston is disengaged from the camshaft by the force of pressurized brake fluid.

It is a further object of the present invention to provide a wheel lock actuated by a key-operated camshaft and including solenoid means for locking the camshaft and thus preventing operation of the wheel lock when the vehicle ignition system is on.

Yet a further object of the present invention is to provide a wheel lock for locking the wheels of a vehicle, and including means to insure that the wheels only may be locked when the wheel brakes are applied and when the vehicle ignition system is off.

BRIEF DESCRIPTION OF THE DRAWINGS

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

FIG. 1 is a perspective view of a vehicle wheel lock in accordance with the present invention, showing interconnections to the brake fluid line of the associated vehicle;

FIG. 2 is a sectional view of the inventive wheel lock as seen generally along the line 2—2 in FIG. 1; and FIG. 3 is a sectional view of the inventive wheel lock as seen generally along the line 3—3 of FIG. 2; for simplicity, the brake fluid line connection fittings are omitted from FIG. 3, and the valve piston is not shown in section.

DESCRIPTION OF THE PREFERRED EMBODIMENTS

Referring now to the drawings, and particularly to FIG. 1 thereof, there is shown a wheel lock designed for theft prevention of a vehicle having a fluid brake system. As seen therein, a wheel lock 10 includes a housing 11 to which a cover 12 is attached by means of flat head screws 13 and 13'. A gasket 14, disposed between housing 11 and cover 12, prevents brake fluid leakage through this interface. Wheel lock 10 further includes a pickproof rotary, key-operated lock 15 extending from housing 11. A key 16 is shown inserted in lock 15 so as to permit actuation of wheel lock 10; key 16 is removable and normally would be withdrawn from lock 15 after engaging or disengaging wheel lock 10.

Wheel lock 10 typically may be installed through an automobile dashboard panel 17, the device being maintained in place by means of a fastening ring 18 which threadingly engages the periphery of lock 15.

Wheel lock 10 is operatively connected in series with the brake fluid line to one or more wheel brakes of the vehicle. As illustrated in FIG. 1, this is accomplished by coupling a brake fluid line 19 from the vehicle brake system master cylinder (not shown) to an inlet 20 in housing 11. Such coupling is accomplished by means of a conventional hex-headed fitting 21. An outlet 22 from wheel lock 10 is connected by means of a conventional fitting 23 to a brake fluid line 24 leading to one or more wheel brake cylinders of the associated vehicle. An insulated wire 25 extends from wheel lock 10 and is used, as described below, for electrical interconnection to the ungrounded terminal of the vehicle ignition system controlled by the vehicle ignition key.

Structural details of wheel lock 10 are evident in FIGS. 2 and 3. Referring thereto, it may be seen that inlet 20 comprises a threaded counterbore 30 extending inwardly from a face 31 of unitary housing 11. An L-shaped channel 32 communicates between counterbore 30 and a generally cylindrical fluid chamber 33 disposed within housing 11 coaxial with lock 15.

As best seen in FIG. 2, the barrel housing 15a of lock 15 is disposed within a counterbore 34 extending inwardly from the front face 35 of housing 11. Counterbore 34 is coaxial with and communicates to cylindrical chamber 33. Lock 15 is retained in place by means of a set screw 36 disposed within a threaded hole 37 which hole also is used to receive cover-retaining screw 13'. A lock shaft 15b projects coaxially rearwardly from barrel housing 15a. Lock shaft 15b rotates about its longitudinal axis as key 16 is turned in lock 15.

Still referring to FIGS. 2 and 3, a unitary camshaft 40 is rotatably disposed within cylindrical chamber 33. The front end 40a of camshaft 40 includes a counterbore 43 which receives lock shaft 15b, camshaft 40 being pinned thereto by means of a grooved pin 41. Accordingly, rotation of key 16 causes concomittant rotation of camshaft 40.

A first portion 42 of camshaft 40, adjacent end 40a thereof, is cylindrical and has an outer diameter just slightly less than the inner diameter of cylindrical chamber 33. A hole 44, the function of which is described below, extends transversely through camshaft portion 42 is provided with a circumferential groove 45 disposed within which is a conventional O-ring 46. This O-ring 46 fits snugly against the interior wall of cylindrical chamber 33.

Camshaft 40 includes a cylindrical portion 47 which extends rearwardly from camshaft portion 42. The diameter of camshaft portion 47 is somewhat less than the diameter of camshaft portion 42. Moreover, the axis of cylindrical portion 47 is parallel to the axis of portion 42, but is offset therefrom by a sufficient amount so that an edge 47' (FIG. 3) of cylindrical portion 47 is slightly spaced from the periphery of portion 42. This spacing permits unimpeded brake fluid flow from channel 32 around camshaft portion 47 even when edge 47' is situated opposite channel 32 as shown in FIG. 3.

Unitary camshaft 40 also includes another cylindrical portion 48, connected rearwardly of portion 47 and having a diameter significantly less than the diameter of camshaft portion 42. Camshaft portion 48 is coaxial with camshaft portion 42 and hence is coaxial with lock 15 and chamber 33. A hole 49, the function of which is described hereinbelow, extends transversely through camshaft portion 48 parallel to transverse hole 44.

The rear end 40b of camshaft portion 48 projects into a cylindrical counterbore 50 extending rearwardly within housing 11 from cylindrical chamber 33. The inner diameter of counterbore 50 is slightly larger than the outer diameter of camshaft cylindrical portion 48, permitting journal engagement therebetween.

As seen in FIG. 3, outlet 22 comprises a threaded counterbore 55 in cover 12. A substantially L-shaped channel 56 communicates between counterbore 55 and a conical counterbore 57 extending upwardly from the interior face 58 of cover 12. Counterbore 57 serves as a valve seat for a piston 60 disposed within a cylindrical bore 61 in housing 11. The axis of cylindrical bore 61 is perpendicular to the principle axis through camshaft 40 and is coaxial with counterbore 57 when cover 12 is attached to housing 11 as shown in the drawings. Note that cylindrical bore 61 communicates with chamber 33.

In the embodiment shown in FIGS. 2 and 3, unitary piston 60 comprises a generally cylindrical body portion 62, the upper end 63 of which is conically tapered to seat in counterbore 57. Tapered end 63 is provided with a peripheral groove 64 in which is disposed an O-ring 65. Preferably, O-ring 65 should be adhesively bonded to groove 64. This will insure that O-ring 65 will not be removed from groove 64 by the force of brake fluid flowing past O-ring 65 when valve piston 60 is spaced from valve seat counterbore 57. The lower portion 66 of valve piston 60 is cylindrical and has an outer diameter just slightly less than the inner diameter of cylindrical bore 61.

The lower end 67 of valve piston 60 is concave and preferably has the shape of a cylindrical section. As best seen in FIG. 3, the radius of valve piston end 67 is approximately equal to the radius of camshaft portion 42. Thus end 67 generally conforms to the cylindrical path defined by edge 47' of offset camshaft portion 47 as camshaft 40 is rotated about an axis coaxial with lock 15.

A pair of diagonally opposed grooves 68 and 68' extend longitudinally along the outer edge of valve piston portion 62. Grooves 68 and 68' are aligned with and form the continuation of a pair of holes 69 and 69' extend completely through end portion 66 of valve piston 60. Holes 69, 69' and grooves 68, 68' facilitate fluid communication between chamber 33, cylindrical bore 61 and counterbore 57 even though piston end portion 66 may be close fitting with the interior of bore 61.

Valve piston 60 is free to reciprocate within cylindrical bore 61, but is biased downward toward cam shaft 40 by means of a coil spring 73. The lower end of coil 73 seats atop a shoulder 74 at the top of piston end portion 66. The upper end of spring 73 seats against an annular spring retainer 75 disposed within housing 11 in a counterbore 76 which is coaxial with cylindrical bore 61. Note that spring retainer 75 prevents the upper end of spring 73 from rubbing against gasket 14; this insures that no gasket particles will be rubbed loose and become emmeshed in valve seat 57.

Operation of the valve portion of wheel lock 10 now should be apparent. With camshaft 40 oriented as shown in FIGS. 2 and 3, valve piston 60 is biased downward by spring 73 against camshaft offset portion 47. Valve piston tapered end 63 and O-ring 65 thus are spaced from valve seat counterbore 57, and there is unimpeded brake fluid communication between inlet 21 and outlet 22. In particular, the brake fluid path includes channel 32, chamber 33, holes 69 and 69', bore 61, grooves 68 and 68′, the region between conical counterbore 57 and valve piston tapered end 63, and outlet channel 56.

With such unimpeded fluid communication, the brake system of the vehicle in which wheel lock 10 is installed operates normally. Thus, when the brake pedal (not shown) is depressed, brake fluid under pressure will be forced through master cylinder line 19, wheel lock 10 and brake line 24 to operate the associated wheel brake cylinders. When the brake pedal is released, the pressure will be relieved and the wheel will be free to turn.

To lock the associated wheels using the inventive device 10, the vehicle brake pedal is depressed sufficiently to place the fluid in lines 19 and 24 under enough pressure to operate the associated wheel brake. While the pedal is so depressed, key 16 is used to rotate lock shaft 15b about the axis through lock 15. The concommitant rotation of camshaft 40, and particularly of camshaft offset portion 47, pushes valve piston 60 upward until piston end portion 63 and O-ring 65 seat firmly against valve seat conical counterbore 57. In the embodiment illustrated, camshaft 40 then will be rotated exactly 180° from the orientation shown in FIGS. 2 and 3.

In this closed valve condition, fluid communication is prevented between inlet 21 and outlet 22. More important, brake fluid under pressure, within line 24, is trapped between the wheel brake cylinder and the seal provided by O-ring 65 and conical counterbore 57. Thus, even if the vehicle brake pedal is released, relieving the brake fluid pressure in master cylinder line 19, the brake fluid trapped in line 24 will remain under pressure, maintaining the associated wheel brakes (not shown) in engaged condition. That is, the associated wheel will be locked and cannot be turned. Note that valve piston 60 is maintained in a closed or seated position against counterbore 57 by the force exerted by camshaft 40.

Preferably, lock 15 is of the type which permits key 16 to be removed in either of two positions. The first such position is that illustrated in FIGS. 2 and 3, wherein valve piston 60 is spaced apart from valve seat 57. The second position for removal of key 16 is that in which valve piston 60 and O-ring 65 are firmly seated against counterbore 57. Thus when wheel lock 10 has been placed in the valve-closed position in which the associated vehicle wheel is locked, key 16 may be removed. The wheel then will remain locked until key 16 once again is placed in lock 15 and rotated to the valve-open position shown in FIGS. 2 and 3.

Referring again to FIGS. 2 and 3, several safety features have been incorporated in wheel lock 10 to insure the inventive device cannot be operated except (a) when the brake pedal is sufficiently depressed as to engage the wheel brake and maintain the vehicle stopped and (b) when the ignition of the associated vehicle is off. The former safety feature is facilitated by a locking piston 77, the latter by a solenoid 78.

As shown in FIG. 2, housing 11 is provided with another cylindrical bore 80 the axis of which is perpendicular to the principle axis through camshaft 40. An internal cylindrical counterbore 82 also is provided in cover 12, coaxial with bore 80. A vent hole 83 communicates between counterbore 82 and the outside of cover 12. Between bore 80 and chamber 33 is a relatively short cylindrical hole 81 coaxial with, but having a smaller diameter than bore 80.

Locking piston 77 (FIG. 2) includes a central cylindrical portion 85 having an outer diameter just slightly less than the inner diameter of bore 80. An O-ring 86 is disposed within a groove 87 about the periphery of piston portion 85. The upper end 88 of locking piston 77 also is cylindrical but has an outer diameter which is smaller than that of portion 85 and also slightly smaller than the inner diameter of counterbore 82. This configuration permits locking piston portion 88 to reciprocate upward into counterbore 82, air within counterbore 82 being vented via tube 83.

A spring 89, disposed about piston portion 88 within bore 80, biases locking piston 77 downward toward camshaft 40. Extending downward from piston central portion 85 is another cylindrical portion 92 having an outer diameter somewhat less than the inner diameter of hole 81. Projecting coaxially from piston portion 92 is a cylindrical pin 93 having an outer diameter sightly less than the inner diameter of transverse hole 49 in camshaft 40.

With camshaft 40 aligned in the valve-open position illustrated in FIG. 2, pin 93 projects into hole 49 and is maintained in this position by bias spring 89. It will readily be apparent that in this configuration, camshaft 40 is locked, and it is impossible to rotate lock 15 or camshaft 40 so as to close valve piston 60 against valve seat 57.

Note that brake fluid entering wheel lock 10 through channel 32 is in fluid communication with the lower end of locking piston 77 via channel 33 and hole 81. Of course, the brake fluid cannot flow past O-ring 86, so that there is no leakage of brake fluid into counterbore 82.

When the brake pedal is depressed, brake fluid within channel 32 and chamber 33 is placed under pressure. This pressure is exerted on the lower end of locking piston 77, causing piston 77 to move upward against the force of spring 89. When piston 77 is so displaced, pin 93 is withdrawn from hole 49, and camshaft 40 is free to be turned by means of key 16.

By appropriate selection of the force of spring 89 and the dimensions of the lower end of piston sections 85 and 92, locking piston 77 can be made to move upward and disengage pin 93 only when the brake fluid pressure in chamber 33 is sufficient to maintain at standstill the vehicle in which wheel lock 10 is installed. With such configuration, it is obvious that the wheel lock valve comprising valve piston 60 and valve seat counterbore 57 can be closed only when the brake fluid pressure in chamber 33 is sufficiently great as to ensure that the associated vehicle is at a complete stop.

In the wheel-locked or valve-closed position, camshaft 40 will be rotated 180° from the position shown in FIG. 2. In such locked condition, when the vehicle brake pedal (not shown) is released, locking piston 77 again will be biased downward by spring 89 and pin 93 will enter hole 49 from the end opposite that shown in FIG. 2. As a result, it will not be possible to rotate key-operated lock 15 or camshaft 40, and thus unlock the wheels until the vehicle brake pedal once again is depressed. When so depressed, locking piston 77 again will reciprocate upward and permit camshaft 40 to be rotated by means of key 16 back to the valve-open position shown in FIG. 2.

As noted earlier, solenoid 78 (FIG. 2) functions to insure that wheel lock 10 cannot be turned to the locked or valve-closed position when the ignition system of the associated vehicle is on. To accomplish this, solenoid 78 is disposed within a chamber 95 formed partly in housing 11 and partly in cover 12. Solenoid 78 includes a solenoid housing 96, a coil 97, a plunger 98 and a bias spring 99. A plunger pin 98′ projects from housing 96 and is disposed within a hole 100 extending between chamber 95 and chamber 33.

Solenoid 78 is aligned so that when camshaft 40 is oriented as shown in FIG. 2, pin 98′ is coaxial with transverse hole 44 through camshaft 40. The outer diameter of pin 98′ is slightly less than the inside diameter of hole 44. Spring 99 biases plunger 98 away from camshaft 40, so that when solenoid 78 is not energized, plunger pin 98′ is completely withdrawn from hole 44. Note that O-ring 46 prevents brake fluid in chamber 33 from leaking through to hole 100, solenoid 78 or lock 15.

One end of coil 97 is electrically connected to ground; i.e., to the metal structure of the vehicle in which wheel lock 10 is installed. This is most easily accomplished by using a metal housing 11 and connecting one end of coil 97 to solenoid housing 96. The electrical path to ground then is through solenoid housing 96, housing 11 and dashboard panel 17 of the associated vehicle. The other end of coil 97 is connected to wire 25 (FIG. 1) which in turn is connected to an ungrounded portion of the vehicle ignition system (not shown) controlled by the vehicle ignition key.

In opertion, when the associated vehicle ignition is turned on, current is supplied to solenoid 78 via wire 25. This energizes solenoid 78, causing plunger 98 to move downward, inserting plunger pin 98' within hole 44. As a result, camshaft 40 is locked in the position shown, and wheel lock 10 cannot be turned to the valve-closed position. Thus solenoid 78 prevents the wheels from being locked while the vehicle ignition is on. Accordingly, were key 16 left within lock 15 while the vehicle was being driven, solenoid 78 would prevent a child or other person from turning key 16 so as to lock the wheels.

Solenoid 78 also prevents wheel lock 10 from being disengaged when the vehicle ignition is on. Thus, with wheel lock 10 in the locked position, camshaft 40 is situated 180° away from the orientation shown in FIG. 2. Should the vehicle engine be started, solenoid 78 would be energized causing plunger pin 98' to project into the end of hole 44 opposite that shown in FIG. 2. This would prevent wheel lock 10 from being turned to the valve-open position until the ignition system was turned off.

Thus, locking piston 77 and solenoid 78 cooperate to insure that the wheels of the associated vehicle can be locked only if (a) the brake pedal is fully depressed, so that the vehicle is at a standstill, and (b) the ignition is off. Only then can key 16 be rotated in lock 15 to place wheel lock 10 in the "on" or valve-closed condition. Conversely, once the wheels have been locked, they cannot be unlocked unless (a) the ignition is off, (b) the brake pedal is fully depressed, and (c) the correct key 16 is inserted in wheel lock 10 and rotated to the valve-open position.

Thus the inventive wheel lock 10 provides a significant deterrent to the theft of the vehicle in which it is installed. The device is simple, inexpensive, and completely safe in operation. Moreover the wheel lock is completely tamperproof; should an attempt be made either to disconnect or disassemble the device, the break line would be opened, leaving the vehicle without brakes.

While the invention has been described with respect to the preferred physical embodiments constructed in accordance therewith, it will be apparent to those skilled in the art that various modifications and improvements may be made without departing from the scope and spirit of the invention. For example, the inventive wheel lock can be installed on wheeled vehicles of all types, including automobiles, trucks and aircraft having either hydraulic or pneumatic brake systems. The wheel lock works satisfactorily on vehicles having either standard or power-assisted brake systems with either disc or drum-type brakes. The wheel lock can be installed either in a single or a dual brake system. In a single brake system, one wheel lock can control all vehicles wheels; in a dual brake system, one wheel lock can control those wheel brakes associated with the brake fluid line in which the wheel lock is interposed.

I claim:

1. A wheel lock adapted for use in a vehicle having a fluid brake system, comprising:
   a valve interposed in the fluid line to at least one wheel brake of said vehicle, said valve comprising:
   a piston and a valve seat adapted to receive said piston,
   means for biasing said piston away from said valve seat,
   a key-operated lock, and
   cam means, cooperating with said key-operated lock, for moving said piston from an unseated open position, permitting brake fluid communication through said valve, to a seated closed position while said brake fluid is under pressure in said brake line upon actuation of said key-operated lock, the pressurized fluid trapped between said closed valve and said brake preventing said wheel from turning,
   a locking piston moveable between a first position and a second position, one end of said locking piston being in fluid communication with a portion of said brake fluid line not between said valve and said wheel brake,
   means for biasing said locking piston to said first position, and
   means, cooperating with said locking piston, for inhibiting operation of said cam means when said locking piston is in said first position and for permitting operation of said cam means when said locking piston is moved to said second position in response to pressure of said brake fluid.

2. A device for locking one or more wheels of a vehicle having a fluid brake system, said device being adapted for interconnection in series with the brake fluid line between the system master cylinder and at least one wheel brake cylinder, said device comprising:
   a body,
   a brake fluid inlet and outlet in said body,
   a chamber within said body,
   a camshaft rotatably disposed within said chamber in said body,
   a valve piston disposed within said body and adapted to reciprocate in response to rotation of said camshaft,
   a channel extending between said inlet and said chamber for permitting brake fluid flow from said inlet to adjacent one end of said valve piston,
   a valve seat in said body and in fluid communication with said outlet, rotation of said camshaft causing said valve piston to move between an open position wherein said one end is spaced from said valve seat so as to permit unimpeded brake fluid flow between said inlet and said outlet, and a closed position wherein said one end is seated against said valve seat so as to trap brake fluid in the portion of said brake fluid line between said outlet and said wheel brake cylinder,
   a cylindrical bore in said body extending from said chamber, said camshaft having a transverse hole therethrough, said hole being aligned with said bore, and
   a locking piston situated within said bore, said locking piston being biased toward said camshaft and having a pin extending from one end thereof, said pin projecting into said transverse hole when said camshaft and valve piston are oriented to said open position, said pin being removed from said transverse hole when said locking piston is displaced away from said camshaft by pressure of brake fluid in said chamber.

3. A device for locking one or more wheels of a vehicle having a fluid brake system, said device being adapted for interconnection in series with the brake fluid line between the system master cylinder and at least one wheel brake cylinder, said device comprising:
   a body,
   a brake fluid inlet and outlet in said body,
   a chamber within said body,
   a camshaft rotatably disposed within said chamber in said body,
   a valve piston disposed within said body and adapted to reciprocate in response to rotation of said camshaft,
   a channel extending between said inlet and said chamber for permitting brake fluid flow from said inlet to adjacent one end of said valve piston,
   a valve seat in said body and in fluid communication with said outlet, rotation of said camshaft causing said valve piston to move between an open position wherein said one end is spaced from said valve seat so as to permit unimpeded brake fluid flow between said inlet and said outlet, and a closed position wherein said one end is seated against said valve seat so as to trap brake fluid in the portion of said brake fluid line between said outlet and said wheel brake cylinder,
   a solenoid disposed in an opening within said body and adapted for electrical interconnection with the ignition system of said vehicle, said solenoid including a moveable plunger pin, and
   a bore in said body extending between said opening and said chamber, said plunger pin of said solenoid projecting into said bore, said camshaft having a transverse hole therethrough, said hole being aligned with said bore, whereby when said solenoid is energized in response to said ignition system being turned on, said plunger pin will be extended into said transverse hole, preventing rotation of said camshaft.

* * * * *